(12) United States Patent
Lee et al.

(10) Patent No.: US 9,507,382 B2
(45) Date of Patent: Nov. 29, 2016

(54) COVER INCLUDING GLASS AND ELECTRONIC DEVICE USING THE SAME

(71) Applicant: Samsung Electronics Co., Ltd., Suwon-si, Gyeonggi-do (KR)

(72) Inventors: Seunghoon Lee, Seoul (KR); Kwangjin Bae, Suwon-si (KR); Jungnam Moon, Incheon (KR)

(73) Assignee: Samsung Electronics Co., Ltd., Suwon-si (KR), `

( * ) Notice: Subject to any disclaimer, the term of this patent is extended or adjusted under 35 U.S.C. 154(b) by 43 days.

(21) Appl. No.: 14/466,398

(22) Filed: Aug. 22, 2014

(65) Prior Publication Data

US 2015/0055292 A1    Feb. 26, 2015

(30) Foreign Application Priority Data

Aug. 26, 2013 (KR) ........................ 10-2013-0100840

(51) Int. Cl.
*G06F 1/16* (2006.01)

(52) U.S. Cl.
CPC ..... *G06F 1/1656* (2013.01); *G06F 2200/1633* (2013.01)

(58) Field of Classification Search
CPC .............................................. G06F 2200/1633
See application file for complete search history.

(56) References Cited

U.S. PATENT DOCUMENTS

| | | | |
|---|---|---|---|
| 8,618,415 B2* | 12/2013 | Wennemer | B29C 43/02 150/154 |
| 8,797,721 B2* | 8/2014 | Pakula | G06F 1/1626 361/679.01 |
| 2011/0188180 A1* | 8/2011 | Pakula | G06F 1/1626 361/679.01 |
| 2012/0118492 A1 | 5/2012 | Coulson et al. | |
| 2012/0147556 A1* | 6/2012 | Kwitek | G06F 1/1656 361/679.56 |
| 2014/0092532 A1* | 4/2014 | Kole | H04M 1/0249 361/679.01 |
| 2014/0152890 A1* | 6/2014 | Rayner | G06F 1/1626 348/376 |

* cited by examiner

*Primary Examiner* — Anthony Q Edwards
(74) *Attorney, Agent, or Firm* — Jefferson IP Law, LLP

(57) ABSTRACT

An electronic device with a cover including glass is provided. The electronic device includes a housing having at least one coupling recess which is formed on the edge of the housing, a cover body configured to cover one surface of the housing, a coupling member coupled to the cover body configured to make the cover body detachable from/attachable to the at least one coupling recess, and a glass member attached to one surface of the cover body.

19 Claims, 12 Drawing Sheets

COVER INCLUDING GLASS AND ELECTRONIC DEVICE USING THE SAME

CROSS-REFERENCE TO RELATED APPLICATION(S)

This application claims the benefit under 35 U.S.C. §119(a) of a Korean patent application filed on Aug. 26, 2013 in the Korean Intellectual Property Office and assigned Serial number 10-2013-0100840, the entire disclosure of which is hereby incorporated by reference.

TECHNICAL FIELD

The present disclosure relates to an electronic device. More particularly, the present disclosure relates to a cover including glass (hereinafter, simply referred as a "cover") and an electronic device including such a cover in which the glass is provided on an exterior portion of the cover so as to improve an esthetic sense, and the cover is configured such that structural deformation which may be caused when attaching/detaching the cover and damage caused by the structural deformation may be mitigated, and detachment/attachment of the cover may be performed more easily.

BACKGROUND

Typically, a portable terminal refers to a device that provides an electronic scheduler function for schedule management or the like, a multimedia function for listening to music, reproduction of video images or the like, an entertainment function for enjoying games or the like, an internet connection function, and a communication function for voice communication or the like. A user may use the portable terminal while carrying it. Portable terminals may be provided with a built-in battery pack or a detachable battery pack so as to provide power such that users may use the terminals while carrying them.

For replacement, the built-in battery packs need to be disassembled and may be damaged or destroyed while being disassembled. Thus, the users generally visit the manufacturer's service center or the like in order to replace the built-in battery packs.

The detachable battery packs are configured to be separable from a portable terminal. Thus, the users may carry and use an extra battery pack by replacing a used battery pack with the extra battery pack. Ordinary portable terminals are usually being configured to allow a battery pack to be detached therefrom.

A type of detachable battery pack may be configured to have a structure in which a battery case is manufactured using a material which is the same as that of the exterior of the terminal and a battery cell is accommodated inside the battery case. Hereinafter, this type of battery pack will be referred to as a "case type". Another type of a detachable battery pack may be configured to have a structure in which the battery pack is mounted in a terminal and a separate battery cover is assembled to protect the battery pack. Hereinafter, this type of battery pack will be referred to as a "cover type". The case type battery pack is relatively rigid but has a disadvantage in that it is somewhat unsuitable for miniaturization. That is, since the battery pack is wholly enclosed by the battery case, there is a limit in reducing the thickness and size thereof. In addition, since a part of the battery case should be accommodated in the terminal, the size of the terminal should be increased.

On the contrary, the cover type battery pack itself is mounted in a terminal without using a separate case. As a result, an increase in the sizes of the battery pack and the terminal may be mitigated. At this time, since the battery cover may be fabricated in a plate shape, miniaturized portable terminals usually employ the cover type battery pack.

In a slim terminal, the battery cover is also fabricated thinly and typically made of a synthetic resin material. However, the battery cover having a reduced thickness may be permanently deformed by a force applied to a coupling structure during the assembly or disassembly of the battery cover in relation to the terminal. Such a battery cover coupling structure may also be deformed by a torsional force applied to the terminal or external impact.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide to a cover and an electronic device including such a cover in which glass is provided on an exterior portion of the cover so as to improve an esthetic sense, and the cover is configured such that structural deformation which may be caused when attaching/detaching the cover and damage caused by the structural deformation may be mitigated, and detachment/attachment of the cover may be performed more easily.

In accordance with an aspect of the present disclosure, an electronic device is provided. The electronic device includes a housing having at least one coupling recess which is formed on an edge of the housing, a cover body configured to cover one surface of the housing, a coupling member coupled to the cover body configured to make the cover body detachable from/attachable to the at least one coupling recess, and a glass member attached to one surface of the cover body.

In accordance with another aspect of the present disclosure, an electronic device is provided. The electronic device includes a housing formed with a plurality of coupling recesses around a peripheral edge thereof that are spaced apart from each other by predetermined intervals, a cover body formed with a plurality of holes around a peripheral edge thereof to correspond to the plurality of coupling recesses, a coupling member configured to be detachable from/attachable to the plurality of coupling recesses by a plurality of protrusion members protruding from the cover body through the holes, and a glass member attached to an outer surface of the cover body.

According to an embodiment of the present disclosure, the cover and the electronic device having the same can have an improved aesthetic sense since glass is provided on the exterior portion of the cover.

In addition, the present disclosure implements a coupling structure between the cover and the electronic device using an elastic coupling member. Thus, it is possible to prevent structural deformation which may be caused when separating the cover and damage of components which may be caused by the structural deformation.

In addition, the present disclosure implements the coupling forces between the protrusion members formed on the coupling member and the coupling recesses to be different from each other according to the order of the protrusion members separated from the recesses when the cover is separated from the body of the electronic device. Thus, the cover can be detached from or attached to the body of the electronic device more easily.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Meanwhile, the various embodiments disclosed in the specification and drawings are merely presented to easily describe technical contents of the present disclosure and help with the understanding of the present disclosure and are not intended to limit the scope of the present disclosure. It is obvious to those skilled in the art to which the present disclosure pertains that other modified embodiments based on the technical idea of the present disclosure besides the embodiments disclosed herein can be carried out.

Prior to describing the present disclosure, an electronic device according to various embodiments of the present disclosure is a terminal that includes a detachable case cover (for example, a battery cover) and may be a mobile communication terminal, a smart phone, a tablet Personal Computer (PC), a hand-held PC, a Portable Multimedia Player (PMP), a Personal Digital Assistant (PDA), or the like.

Figure 1:
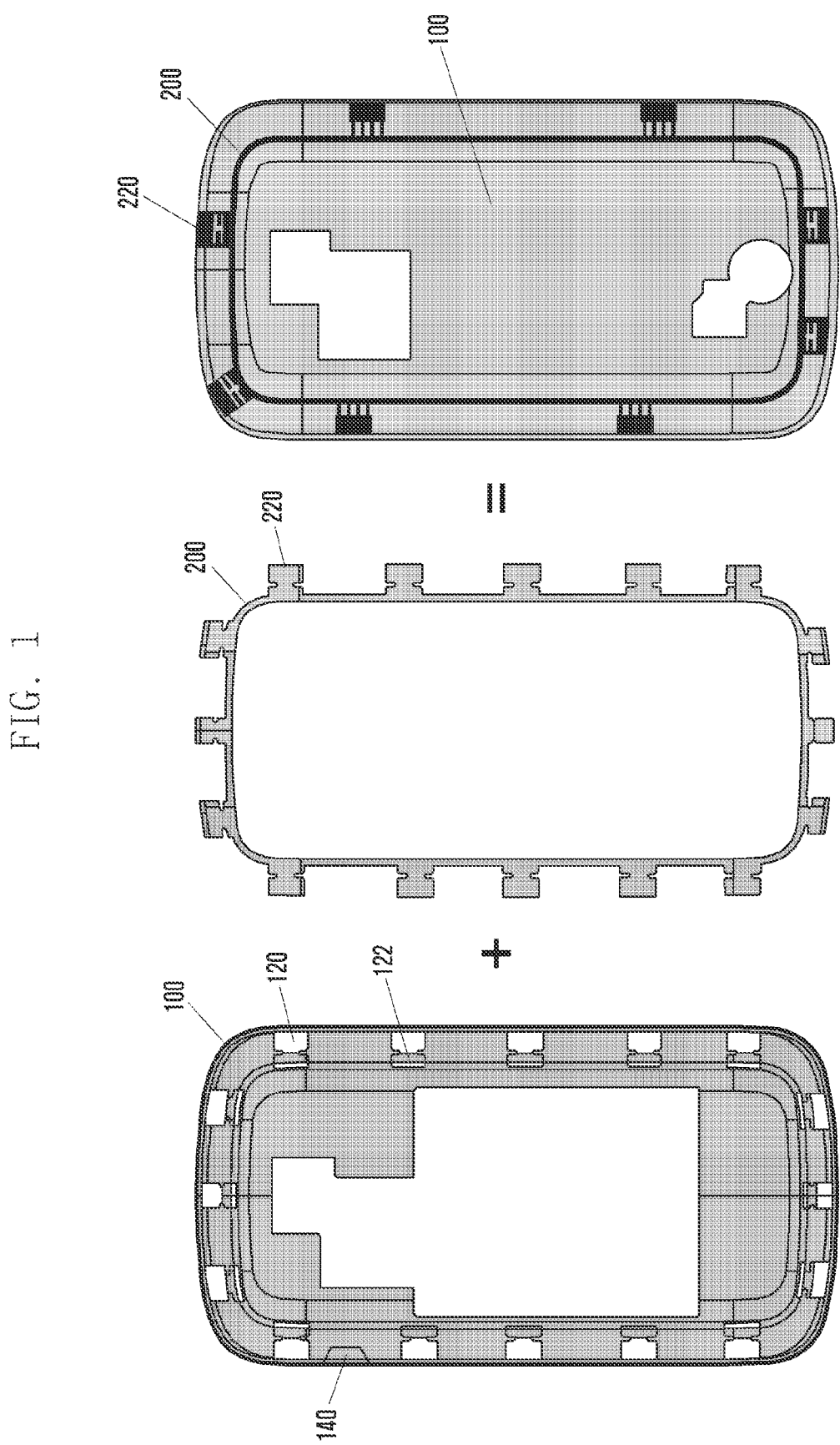
FIG. 1 is a view illustrating coupling of a cover body and a coupling member according to an embodiment of the present disclosure.
Figure 2:
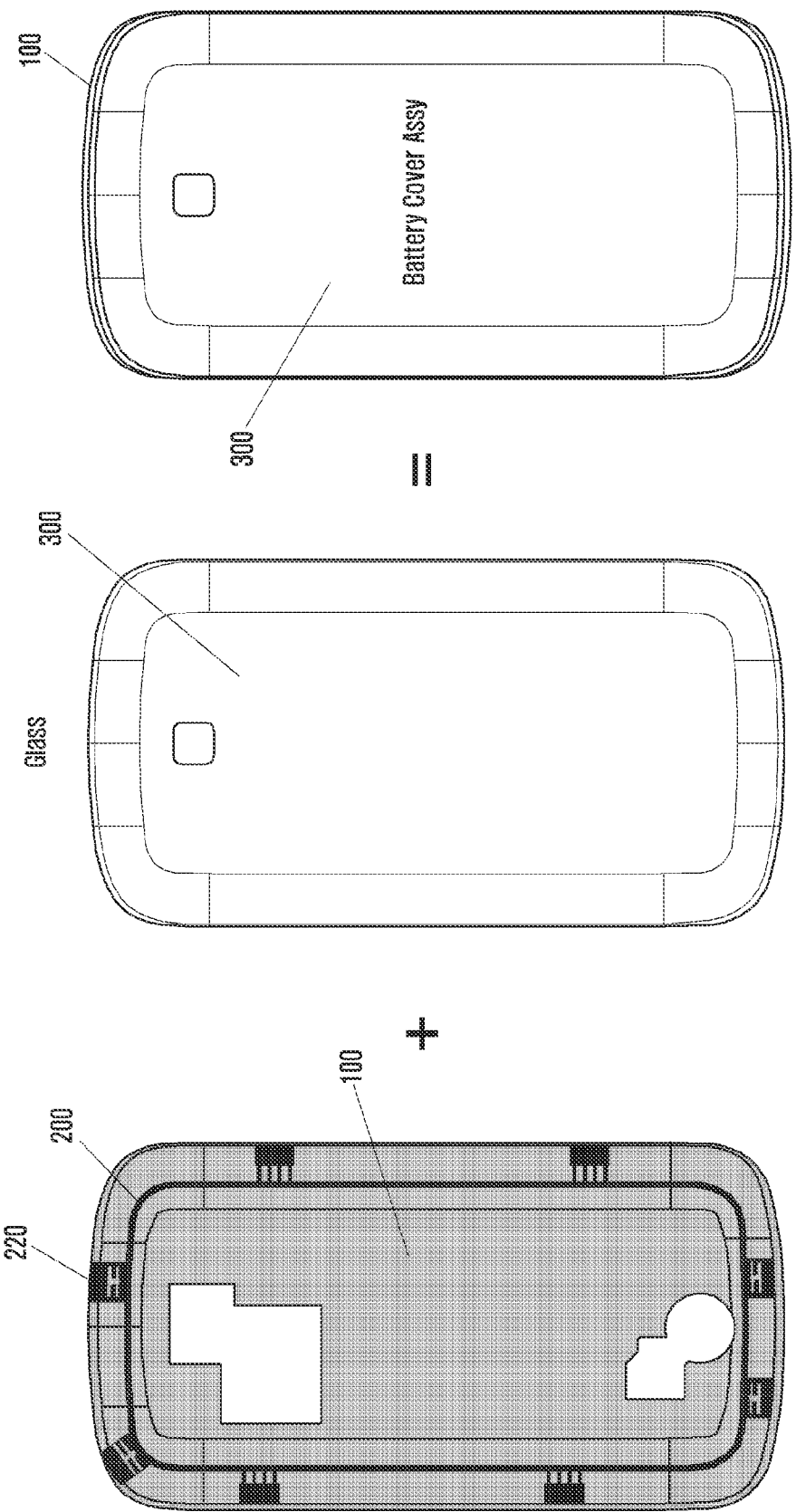
FIG. 2 is a view illustrating coupling of a cover body and a glass member according to another embodiment of the present disclosure.
Figure 3:
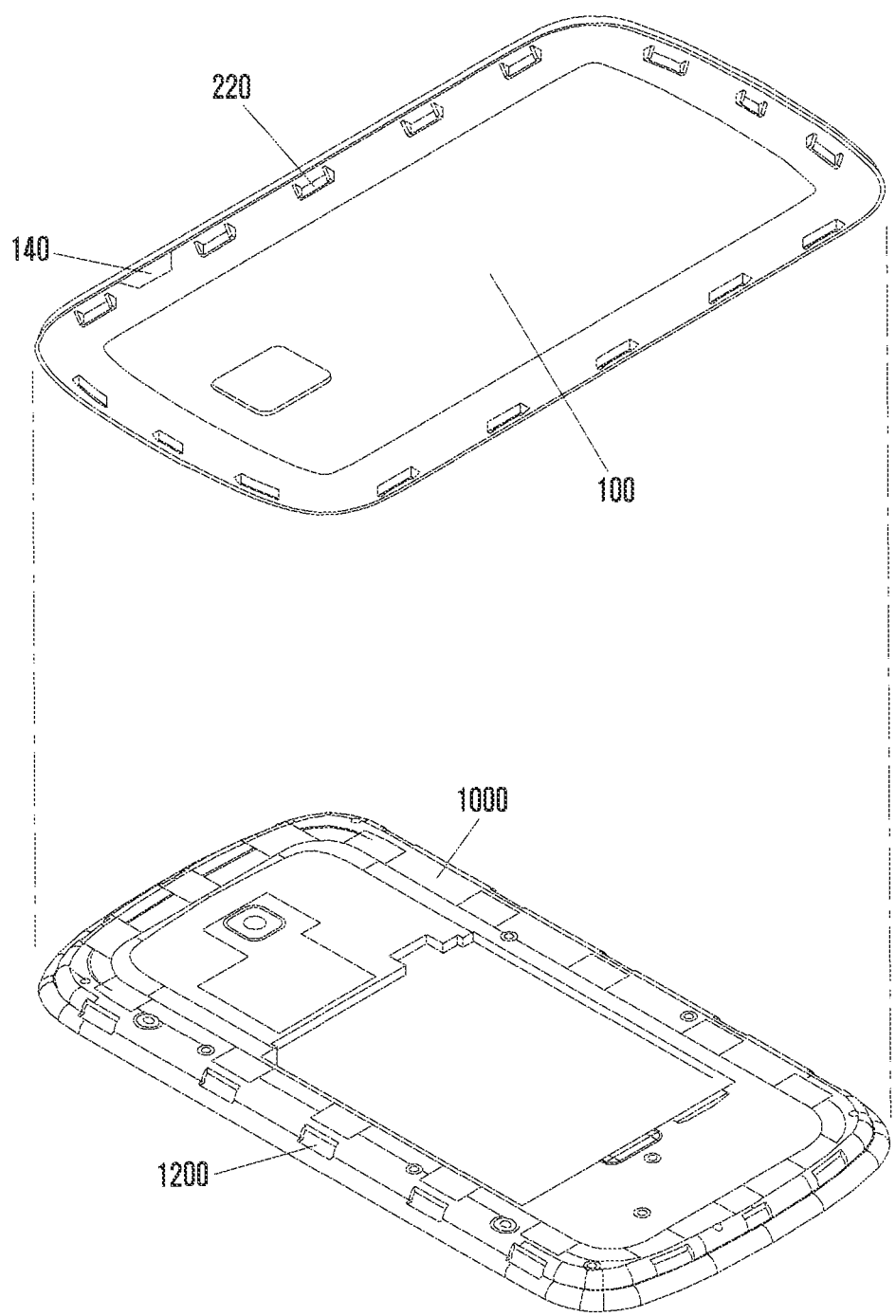
FIG. 3 is a view illustrating a state where a battery cover formed through the processes illustrated in FIGS. 1 and 2 is being coupled to a housing of an electronic device according to an embodiment of the present disclosure.

FIG. 1 is a view illustrating coupling of a cover body and a coupling member according to an embodiment of the present disclosure, FIG. 2 is a view illustrating coupling of an cover body and a glass member according to another embodiment of the present disclosure, and FIG. 3 is a view illustrating a state where a battery cover formed through the processes illustrated in FIGS. 1 and 2 is being coupled to a housing of an electronic device according to an embodiment of the present disclosure.

Referring to FIG. 3 first, a battery cover according to an embodiment of the present disclosure is provided to be detachable from/attachable to a housing 1000 of an electronic device. A battery pack is accommodated in the housing 1000 of the electronic device and the housing 1000 may be covered by a battery cover so as to conceal and protect the battery pack.

Referring to FIGS. 1 to 3, the battery cover according to an embodiment of the present disclosure includes a cover body 100, a coupling member 200, and a glass member 300.

Referring to FIG. 3, the housing 1000 configured to accommodate the battery of the electronic device includes one or more coupling recesses 1200 around the peripheral edge which are spaced apart from each other by predetermined intervals.

Referring to FIG. 1, the cover body 100 includes one or more holes 120 formed around the peripheral edge to correspond to the coupling recesses 1200. The one or more holes 120 may be formed to correspond to the positions of the coupling recesses 1200 and to be spaced apart from each other by predetermined intervals.

The cover body 100 may further include sub-holes 122 configured to be coupled with the coupling member 200 inside the holes 120. The sub-holes 122 may be formed adjacent to the holes 120. In addition, as a structure for separating the cover body 100 coupled to the housing 1000, the cover body 100 may further include a separating recess 140 which is formed by caving a portion of the peripheral edge of the cover body 100 in a predetermined depth.

The separating recess 140 has an inwardly caved structure of a portion of the outer edge of the cover body 100 and may be formed to allow the battery cover to be easily detached from the housing 1000 using, for example, a user's nail. In the present disclosure, it is exemplified that a single separating recess 140 is formed at the left top end of the battery cover when viewed from the outside.

The cover body 100 may be formed using at least one of a heat-endurable plastic, PolyCarbonate (PC), Polyethylene Terephthalate Glycol (PETG), PolyEthylene (PE), and Polypropylene (PP) and may be provided through at least one of extrusion molding, blow molding, injection molding and vacuum molding. Alternatively, the cover body 100 may be provided through at least one of a plurality of plastic molding methods such as rotation system powder molding, casting molding, and cold dipping.

A coupling member 200 is formed along the outer peripheral edge of the cover body 100 and includes protrusion members 220 protruding outward from the coupling member 200. The coupling member 200 may be formed in a ring shape along the outer peripheral edge of the cover body 100.

The coupling member 200 may be coupled to one surface of the cover body 100 through at least one of fitting, adhesion, bonding, dual injection molding, and insert injection molding. For example, the coupling member 200 may further include a sub-protrusion member (not illustrated) between each two adjacent protrusion members 220 and the sub-protrusion members may be fitted into the sub-holes 120, respectively. At this time, adhesive or the like may be additionally used between the contacted surfaces of the sub-protrusion members and the sub-holes 120.

The protrusion member 220 may be formed to be detachable from/attachable to the coupling recesses 1200 by being exposed through the holes 120 formed in the cover body 100. For example, the protrusion members 220 may be configured as hooks or the like that may be engaged in the coupling recesses 1200. At this time, each of the holes 120 may be formed in a size corresponding to that of the protrusion member 220 facing it, in which the latter may be fitted in the former. The surfaces of the protrusion member 220 and the hole 120 which are in close contact with each other when the protrusion member 220 is fitted in the hole 120 may be coupled more rigidly by an adhesive, welding, elasticity, etc.

In particular, the present disclosure discloses an example in which the coupling member 200 is made of an elastic material such that the protrusion members 220 are elastically coupled with coupling recesses 1200. This will be described in detail below with reference to FIG. 4.

The elastic material may be composed of at least one of Urethane, silicon, and rubber. Meanwhile, in addition to being coupled to the cover body 100 through the fitting, the coupling member 200 may be coupled to the cover body 100 through any of dual injection molding, insert injection molding, welding, and bonding or a combination thereof and the coupling method may not be limited to these.

Referring to FIG. 2, a glass member 300 may be attached to a product obtained by coupling the cover body 100 and the coupling member 200 using the method described above with reference to FIG. 1.

Specifically, the glass member 300 may be attached to the cover body 100 on the opposite side to the protrusion direction of the protrusion members 220. The glass member 300 may be coupled in a form that entirely covers one surface of the cover body 100.

For example, the inner surface of the glass member 300 and the outer surface of the cover body 100 may be coupled to each other through an adhesive, a fitting structure, or the like. As such, the outer surface of the battery cover is formed by the glass member 300 and, thus, may have improved aesthetics.

Referring to FIG. 3, the battery cover configured by coupling the cover body 100, the coupling member 200, and the glass member 300 may be attached to/detached from a housing of an electronic device.

Specifically, when the protrusion members 220 of the battery cover are coupled to the coupling recesses 1200 formed on the housing 1000 of the body of the electronic device, the battery cover may be coupled to the body of the electronic device.

The housing 1000 may be a structure that forms a part of the body of the electronic device so as to accommodate the battery pack and to protect inner electric components, circuit components, etc. For example, the housing 1000 may be a rear cover. A battery is accommodated inside the housing 1000 and a recess, an opening for exposing a camera or the like may be formed in the housing 1000.

The housing 1000 may include the coupling recesses 1200 configured to be engaged with the protrusion members 220 of the battery cover so as to couple the battery cover to the body of the electronic device. The coupling recesses 1200 are formed around the peripheral edge of the housing 1000 in one or more groove shapes which are spaced apart from each other by predetermined intervals, and positioned so as to face the protrusion members 220.

Hereinafter, the above-described coupling structure between the battery cover according to an embodiment of the present disclosure and the body of the electronic device will be described in more detail with reference to FIGS. 4 to 7.

Figure 4:
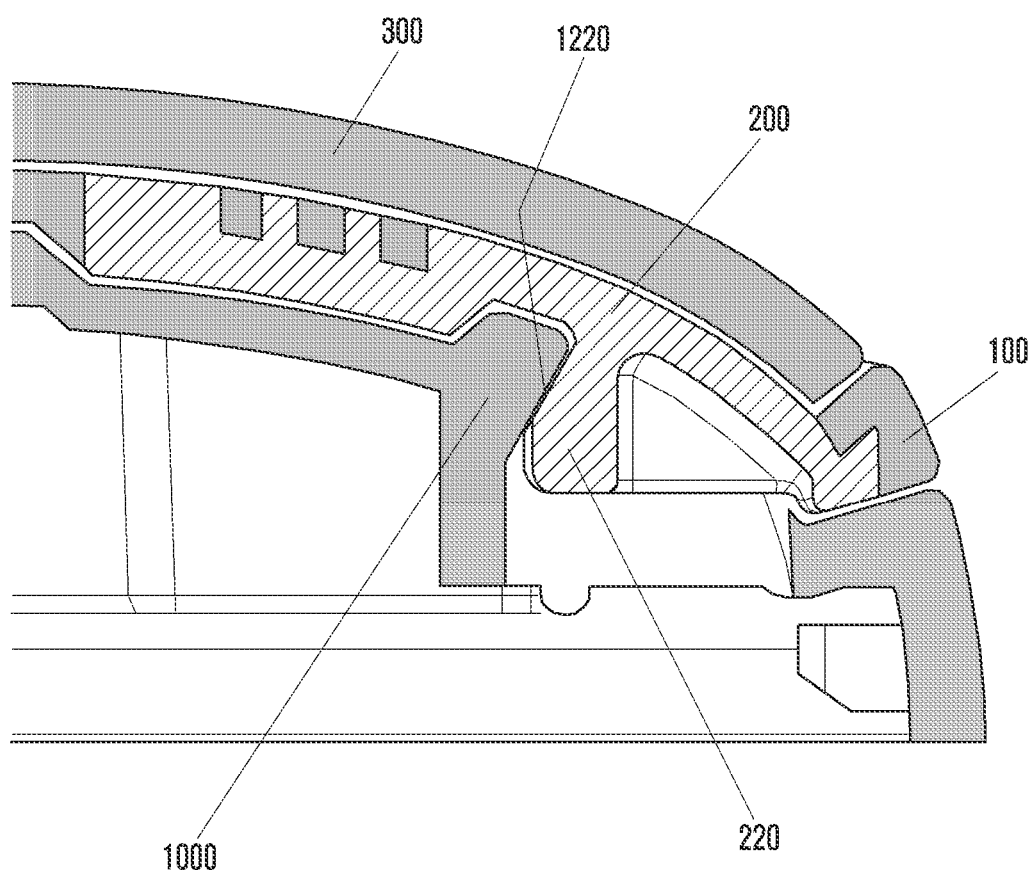
FIG. 4 is a cross-sectional view illustrating a coupling structure when the battery cover formed according to an embodiment of the present disclosure.
Figure 5:
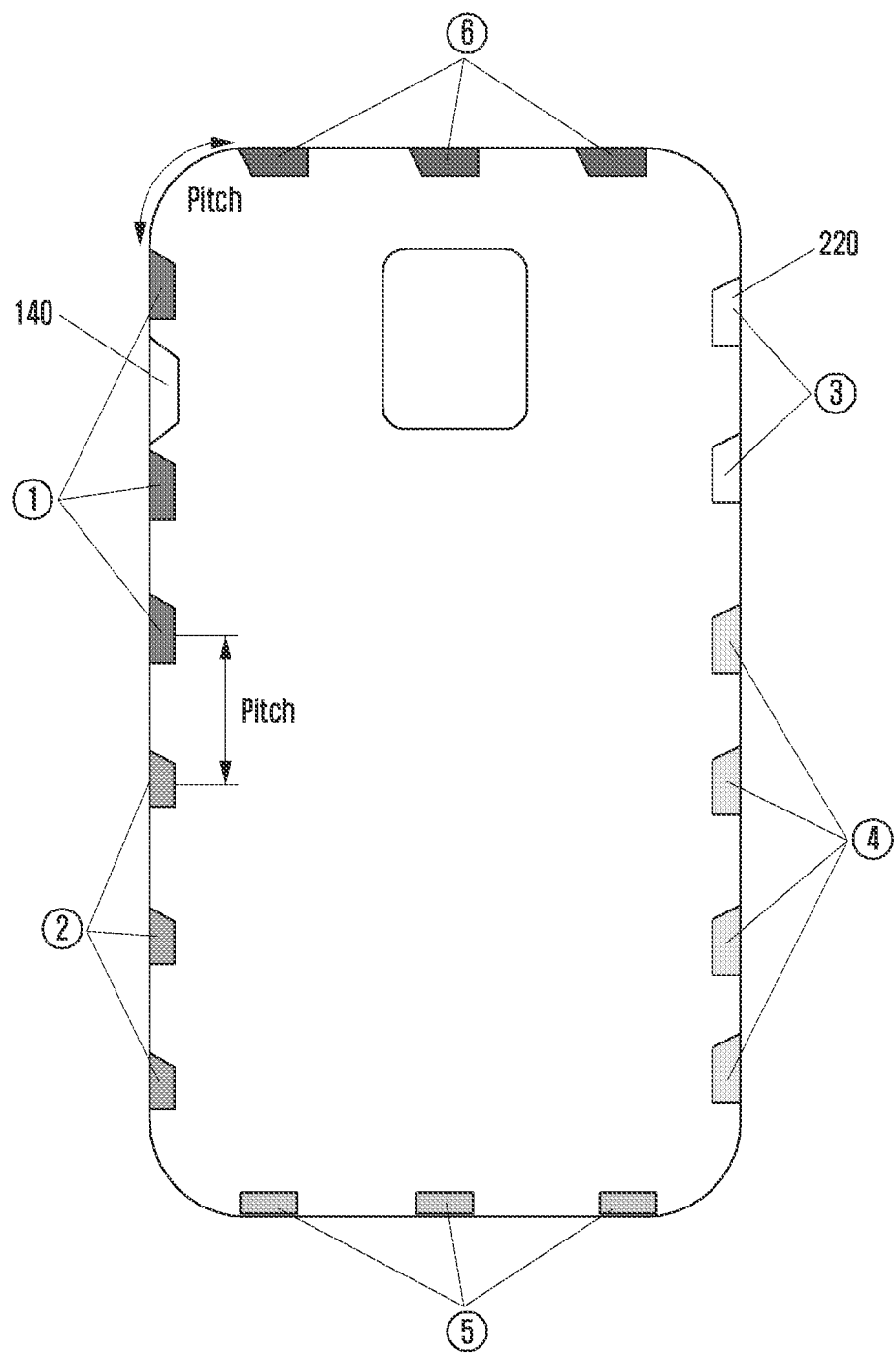
FIG. 5 is a view schematically illustrating an inner surface of a battery cover according to an embodiment of the present disclosure.
Figure 6:
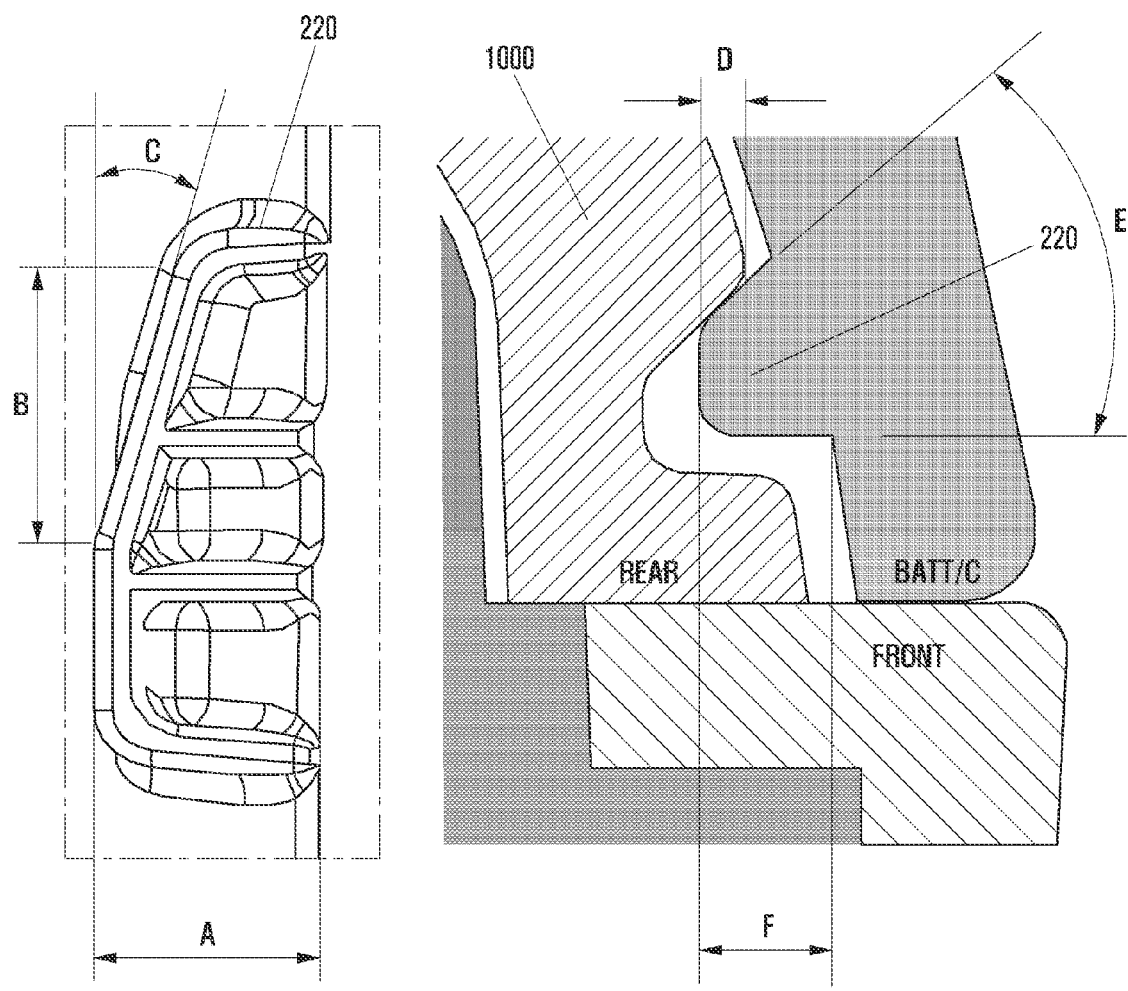
FIG. 6 is a view illustrating a part of a coupling member according to an embodiment of the present disclosure.

FIG. 4 is a cross-sectional view illustrating a coupling structure when the battery cover formed according to an embodiment of the present disclosure is coupled to a body of an electronic device, FIG. 5 is a view schematically illustrating an inner surface of a battery cover according to an embodiment of the present disclosure, and FIG. 6 is a view illustrating a part of a coupling member according to an embodiment of the present disclosure.

Referring to FIG. 4, the coupling recess 1200 of the housing 1000 includes, on the edge of one surface thereof, an inclined surface 1220 inclined from the inside to the outside. Since the protrusion member 220 of the battery cover is formed of an elastic material, when the protrusion member 220 is coupled to the coupling recess 1200, the original volume of the protrusion member 220 is compressed by a predetermined extent by the inclined surface 1220 and, when the protrusion member 220 is completely engaged in the coupling recess 1200, the compression is released and the protrusion member 220 is expanded to its original volume. As a result, the protrusion member 220 may be rigidly fit into the coupling recess 1200.

That is, according to the embodiment of the present disclosure, since the protrusion member 220 is formed as an elastic member and detachably engaged in the recess 1200 using the elasticity of the elastic member, a deformation of the battery cover during the separation of the battery cover or by external impact can be mitigated.

Referring to FIG. 6, each of the protrusion members 220 according to the embodiment of the present disclosure may include an inclined structure in a portion positioned relatively near the separating recess 140. The inclined structure may be formed such that the portion of the inclined structure which is positioned relatively near the separating recess 140 is tapered toward the separating recess 140. The inclined angles C, implementing the inclined structures, may be differently formed according to the order of the protrusion members 220 which are sequentially separated when separating the battery cover, starting from the separating recess 140.

Specifically, the inclined angles may be determined in such a manner that a protrusion member 220 separated relatively earlier in sequence when the battery cover is separated starting from the separating recess 140 has a relatively larger inclined angle. As such, the friction in a protrusion member 220 which is relatively near the separating recess 140, may be reduced to be relatively small at the time of removing the battery cover, and the friction in a protrusion member which is relatively distant from the separating recess 140, may be maintained to be relatively strong at the time of separating the battery cover. This configuration may maintain the coupling between the battery cover and the body of the electronic device without being loosened while allowing the battery cover to be easily separated.

This configuration will be described again with reference to FIG. 5. When the battery cover is separated starting from the separating recess 140, the protrusion members 220 are released from coupling recesses 1200 in sequence from the protrusion members ① which are relatively near the separating recess 140 to the protrusion members ④ which are relatively distant from the separating recess 140.

At this time, since the protrusion members 220, which are relatively nearer to the separating recess 140, have a surface having more steeply inclined structures in the direction facing the separating recess 140, the friction between the protrusion members 220 and the coupling recesses 1200 may be reduced to be small as compared to that in a less steeply inclined structure. Since the protrusion members 220 which are relatively more distant from the separating recess 140 have a relatively less steeply inclined angle, the friction between the protrusion members 220 and the coupling recesses 1200 may be maintained such that the separation and loss of the battery cover can be mitigated.

In addition, in order to allow the battery cover to be easily detached or attached, the shapes of the protrusion members 220 may be formed to be different from each other depending on the distances to the separating recess 140. That is, according to the separated order of the protrusion members 220 in sequence when the battery cover is separated starting from the separating recess 140, widths A of the protrusion members 220, widths B of open angles, open angles C, engagement amounts D to be engaged in the coupling recesses 1200, engagement angles E, and lengths F of the protrusion members 220 may be determined to be different from each other.

With reference to one protrusion member 220 and one coupling recess 1200 corresponding thereto, the width A of the protrusion member 220 may refer to a length formed from the outer edge to the inside of the battery cover, the open angle C may refer to an angle of a surface of the protrusion member 220 inclined in the direction facing the separating recess 140, the width B of the open angle may refer to the vertical length of the inclined surface of the protrusion member 220, the engagement amount D may refer to a length of the protrusion member 220 to be engaged inside the coupling recess 1200, the engagement angle E may refer to an inclined angle from a horizontal line when the protrusion member 220 is engaged in the coupling recess 1200, and the length F of the protrusion member 220 may refer to a height of the protrusion member 220 protruding vertically from the plane of the elastic member 200.

For example, starting from the separating recess 140, a protrusion member 200 which is separated relatively earlier when the battery cover is separated may be formed to have a smaller engagement amount D to be engaged in the coupling recess 1200. For example, referring to FIGS. 5 and 6, the protrusion members ④ which are almost lastly separated may be formed to have the engagement amount in the range of 0.25 mm to 0.35 mm, and the protrusion members ①, ②, ③, ⑤, and ⑥ which are separated in the earlier stage may be formed to have the engagement amount D in the range of 0.15 mm to 0.25 mm.

Alternatively, starting from the separating recess 140, a protrusion member 220 which is separated relatively earlier when the battery cover is separated may be formed to have a larger open angle C. For example, the open angles C of the protrusion members ③ and ④ which are almost lastly separated may be formed in the range of 10 to 15 degrees and the open angles C of the protrusion members ①, ②, ⑤ and ⑥ which are separated in the initial stage may be formed in the range of 15 to 20 degrees.

Alternatively, starting from the separating recess 140, a protrusion member 220 which is separated relatively earlier when the battery cover is separated may be formed to have a narrower width A. For example, the widths A of the protrusion members ① which are separated in the initial stage may be formed in the range of 2.0 mm to 3.5 mm and the widths A of the remaining protrusion members ②, ③, ④, ⑤ and ⑥ may be formed in the range of 3.0 mm to 4.0 mm.

Figure 7:
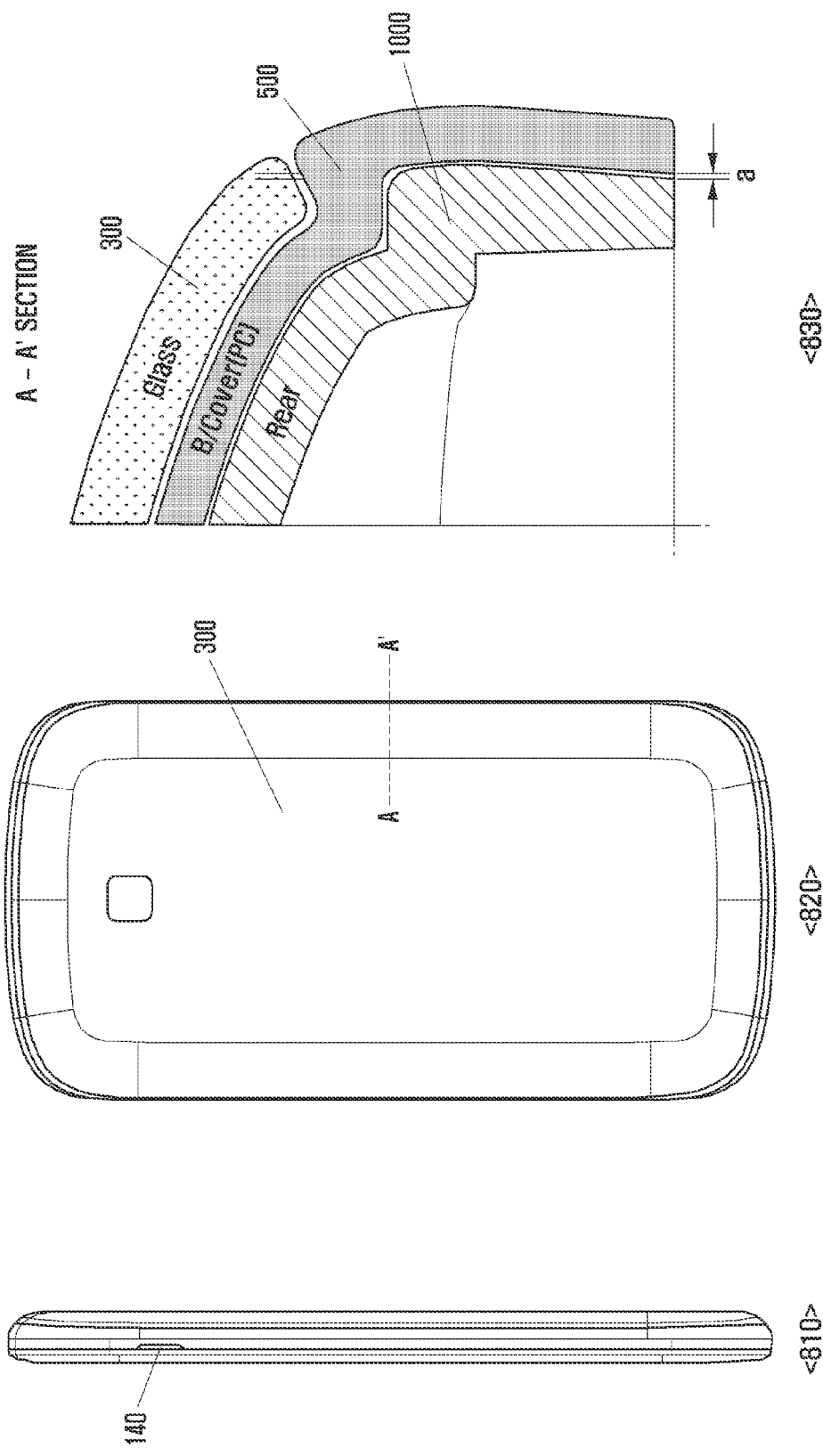
FIG. 7 illustrates a coupling structure when the battery cover formed according to another embodiment of the present disclosure.

FIG. 7 illustrate a coupling structure when the battery cover formed according to another embodiment of the present disclosure is coupled to a body of an electronic device.

Referring to view FIG. 7, a side view 810, a front view 820, and a cutaway view 830 from the line A-A' of a battery cover according to the present embodiment are shown. The battery cover according to the present embodiment is not formed with coupling members and a glass member 300 is attached to a PC member 500 as shown in cutaway view 830, unlike the battery covers of the other various embodiments of the present disclosure. In addition, an undercut structure "a" is formed along the peripheral edge of the PC member 500. With the undercut structure "a", the PC member 500 may wrap and cover the rear cover 1000 to fasten the battery cover to the body of the electronic device. The undercut structure "a" may be formed by cutting the peripheral edge by about 5 degrees with reference to a vertical line to have a width of 0.1 mm. However, the present disclosure is not limited thereto. In addition, a separating recess 140 is provided as shown in the side view 810.

Meanwhile, FIGS. 8 to 12 are views illustrating examples in which other components are accommodated in covers according to various embodiments of the present disclosure. In the following description, it is assumed that the battery cover illustrated in FIGS. 8 to 12 corresponds to the battery cover described above with reference to FIGS. 1 to 7.

Figure 8:
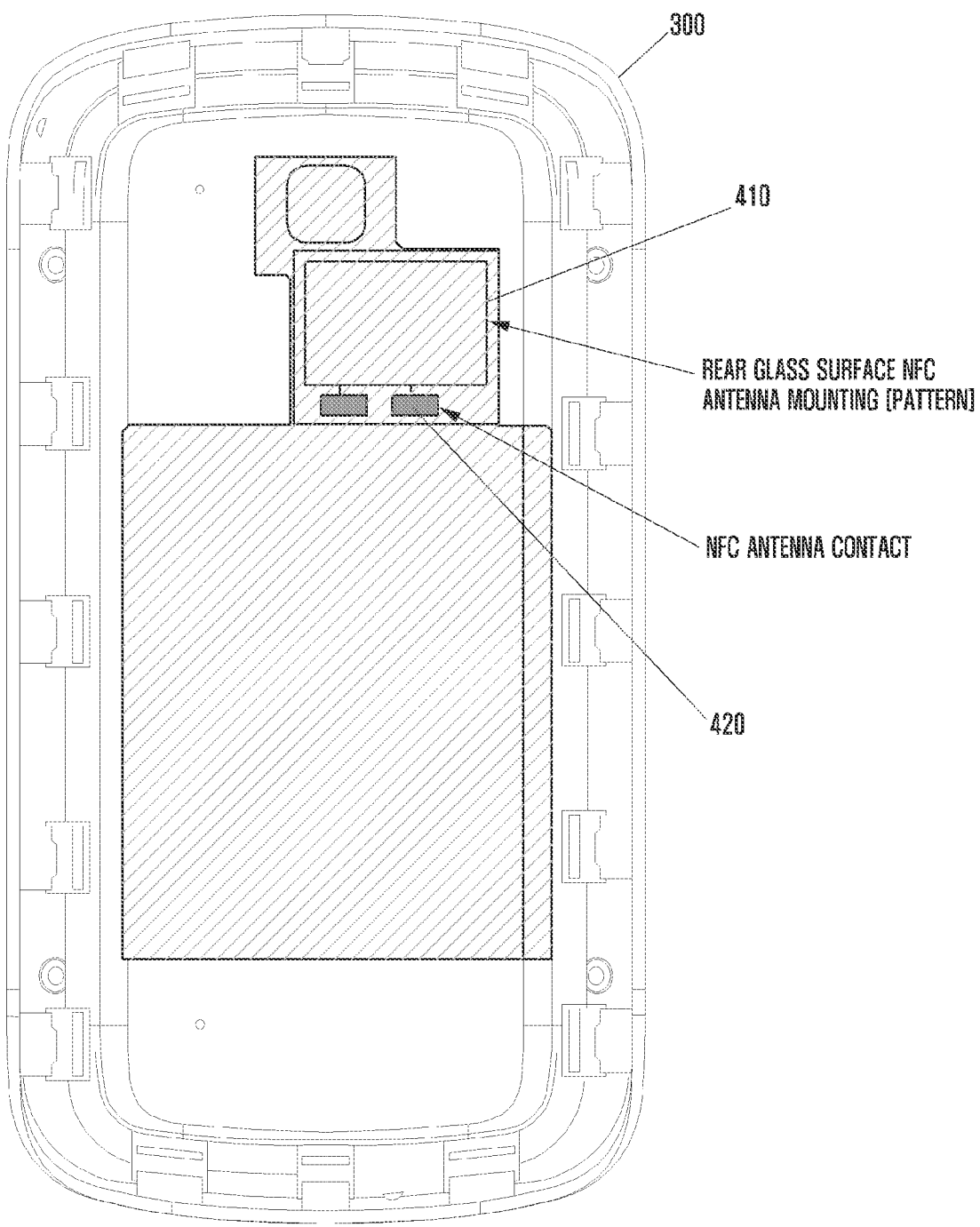
FIGS. 8, 9, 10, 11, and 12 are views illustrating examples in which other components are accommodated in a cover according to an embodiment of the present disclosure.

Referring to FIG. 8, the cover according to the present embodiment may be provided with a Near Field Communication (NFC) antenna pattern 410 and NFC antenna contacts 420 on a portion of the rear surface of the glass member 300. At this time, the glass member 300 which has a lower conductivity as compared to metal or other materials may suppress generation of static electricity and, in particular, has little effect on radiation of the antenna. Therefore, when the antenna pattern 410 and the antenna contacts 420 are mounted on the rear surface of the glass member 300, it is possible to secure a space for mounting other components of the electronic device and to enhance the reliability of the antenna.

Figure 9:
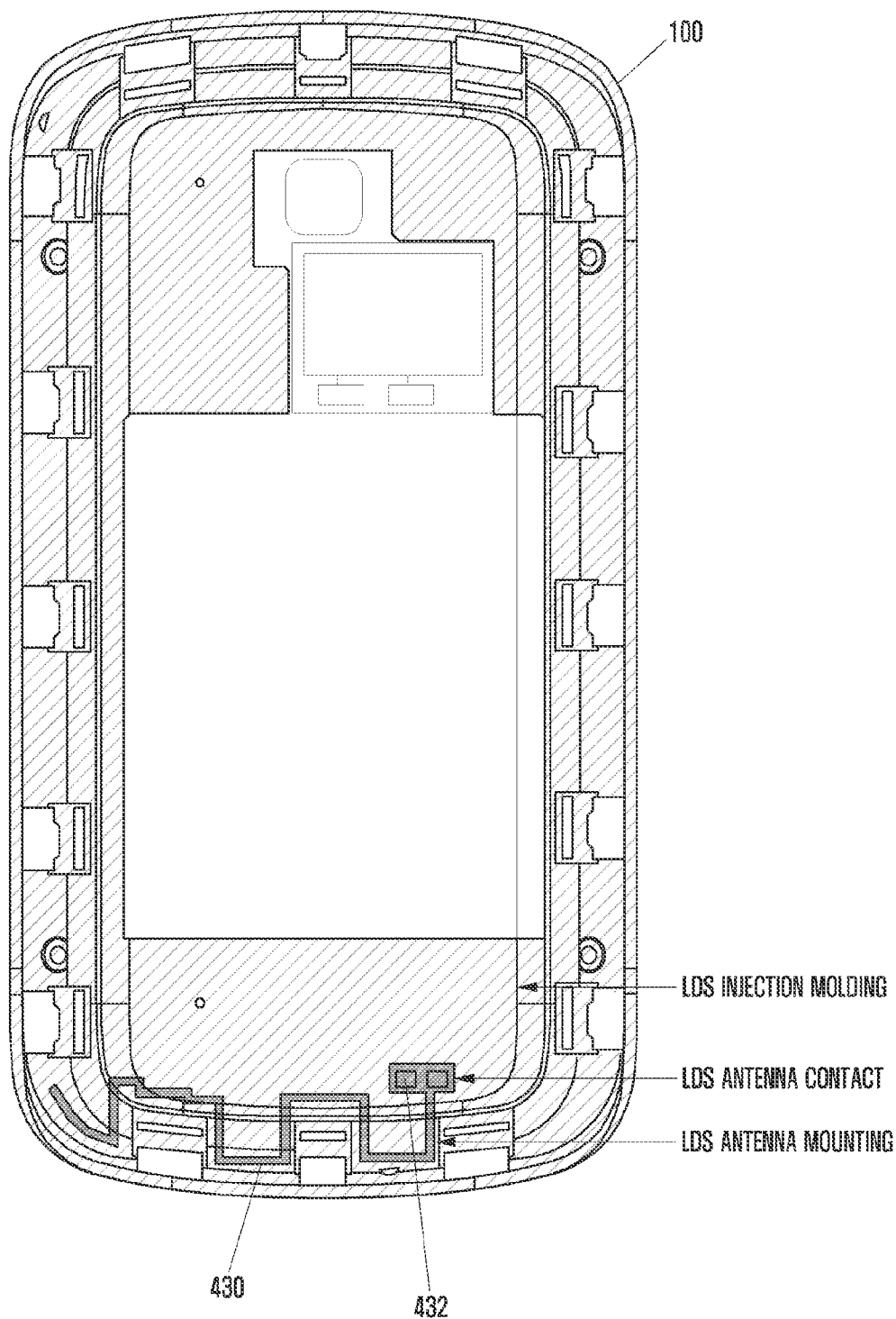

Referring to FIG. 9, the cover according to the present embodiment may be provided with a Laser Direct Structuring (LDS) antenna 430 and LDS antenna contacts 432 on a portion of the rear surface of the glass member 300 of the cover body 100. That is, the LDS antenna may be mounted on the inner surface of the battery cover through an LDS injection molding method in which a pattern may be formed on the rear surface of the glass member 300 using a laser, and copper and nickel are plated on the pattern so as to implement an electric characteristic. The rear surface of the glass member 300 has a relatively wider empty space where other flat components may be mounted, as compared to the electronic device. Therefore, when the thin LDS antenna is formed on the rear surface of the glass member 300, it is possible to secure a space for mounting other components of the electronic device. In addition, as compared to a manufacturing method of existing antennas, LDS antennas may be manufactured with a high yield since it is relatively easy to design a pattern of the LDS antennas and, even if an error exists in the designed pattern, the pattern may be easily corrected through a correction operation using a program. In particular, the number of $4^{th}$ Generation (4G) Long Term Evolution (LTE) frequency bands is 44 which is double the number of $3^{rd}$ Generation (3G) frequency bands which is 22, and the number of frequency bands will be further increased in the future. Therefore, it may be efficient to use the technology of mounting the LDS antenna on the inner surface of the glass member 300 configured as a component of the battery cover as described above.

Figure 10:
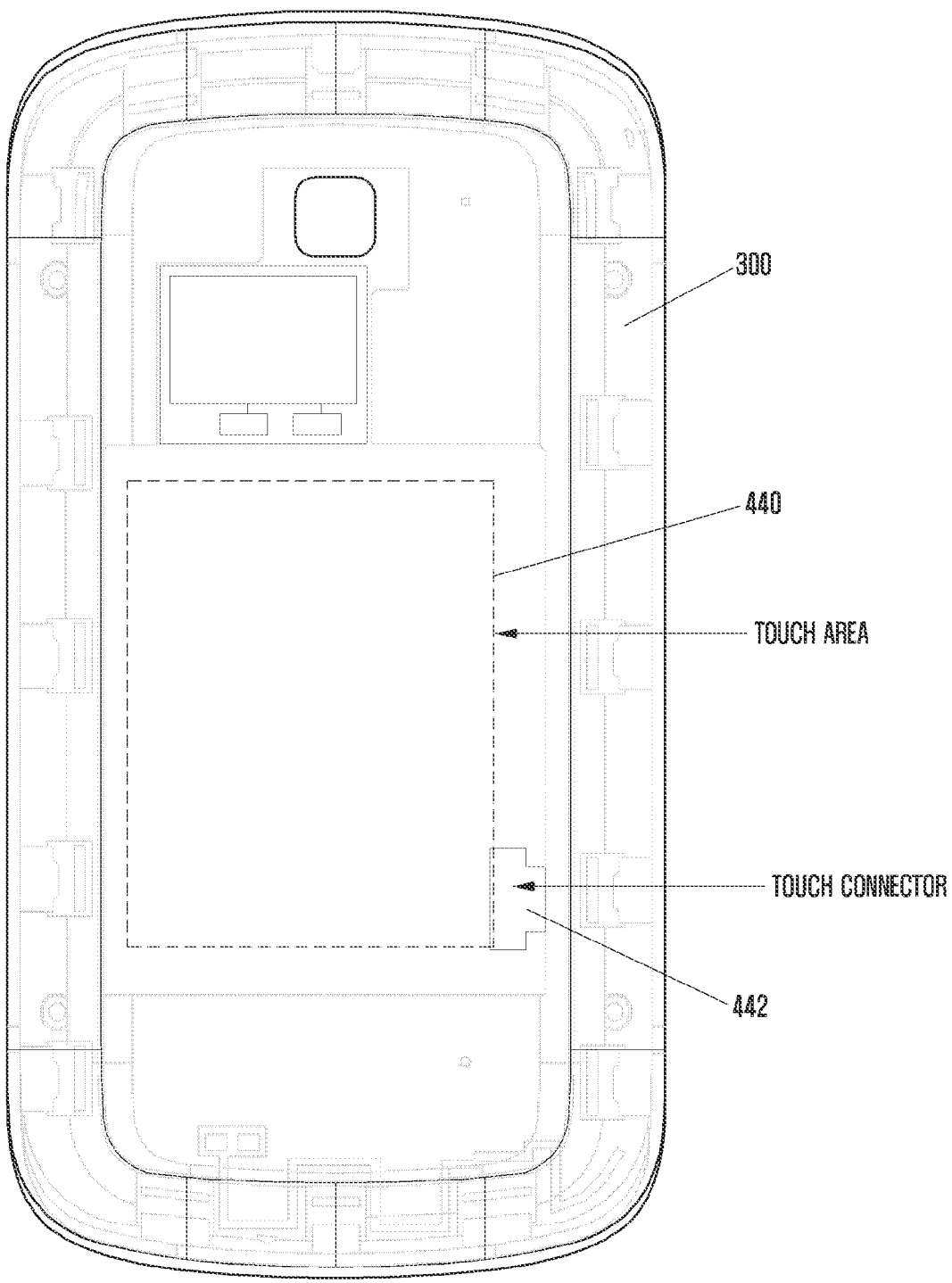

Referring to FIG. 10, the cover according to an embodiment of the present disclosure may be provided with a touch sensor unit 440 on the inner surface of the glass member 300 so as to support a rear surface touch function. The touch sensor unit 440 may be a passive touch panel configured to receive an electric signal and transmit a reflection signal for the received electric signal. The passive touch panel refers to a type which does not require a separate power supply. For example, the touch sensor unit 440 may be a Surface Acoustic Wave (SAW) type touch panel. The SAW type touch panel is well-known to a person having an ordinary knowledge in the art and, thus, a detailed description thereof will be omitted. The touch sensor unit 440 may be connected with an electronic component (e.g., a main circuit board) of a body through a wireless method or a contact method using a touch connector 442. The wireless method may be an Ultra Wide Band (UWB) method, an NFC method, or the like.

Figure 11:
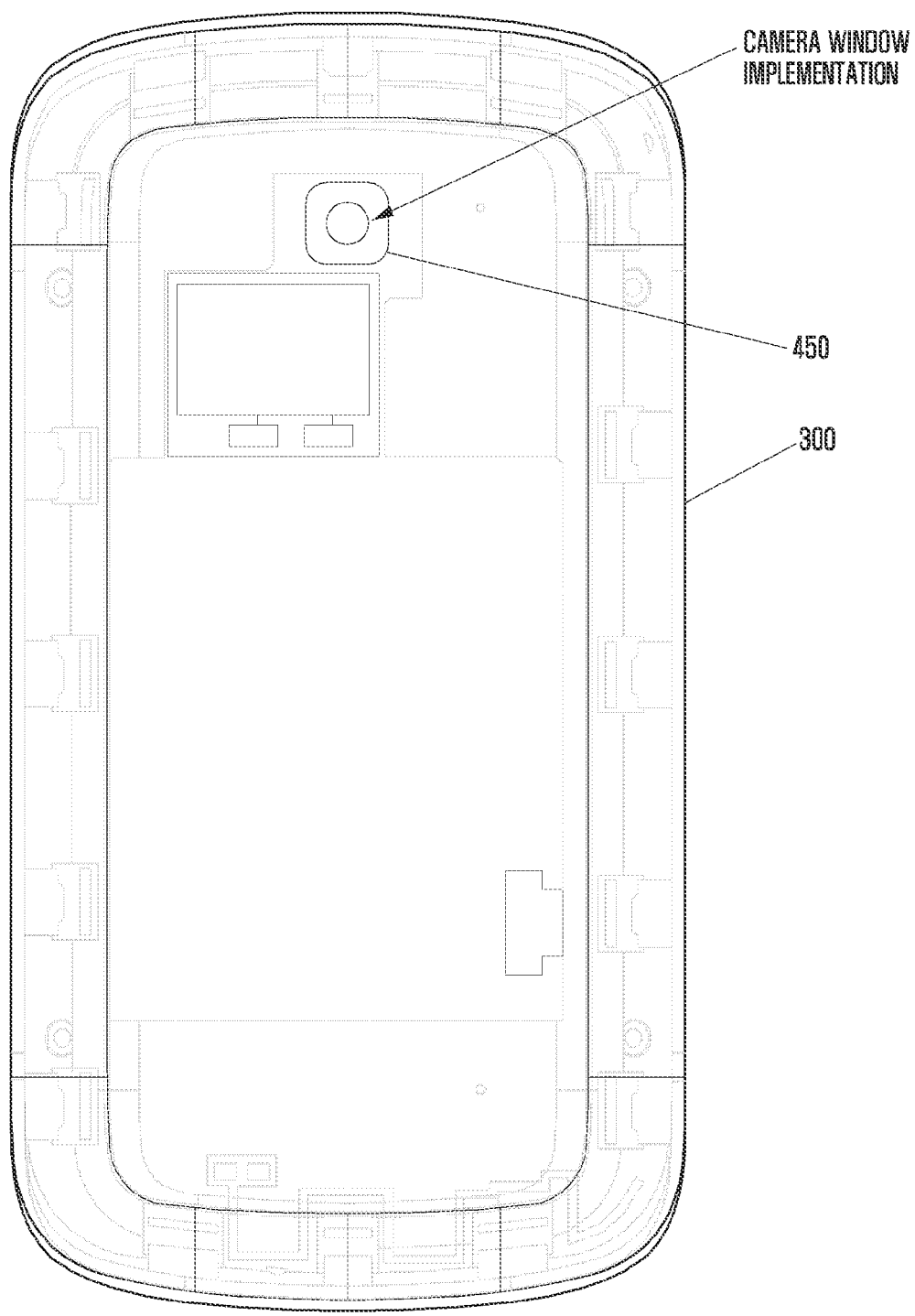

Referring to FIG. 11, the cover according to an embodiment of the present disclosure may implement a camera window 450 using the glass member 300. That is, the glass member 300 may be formed as a battery cover-integrated camera window 450 instead of an existing camera window.

Figure 12:
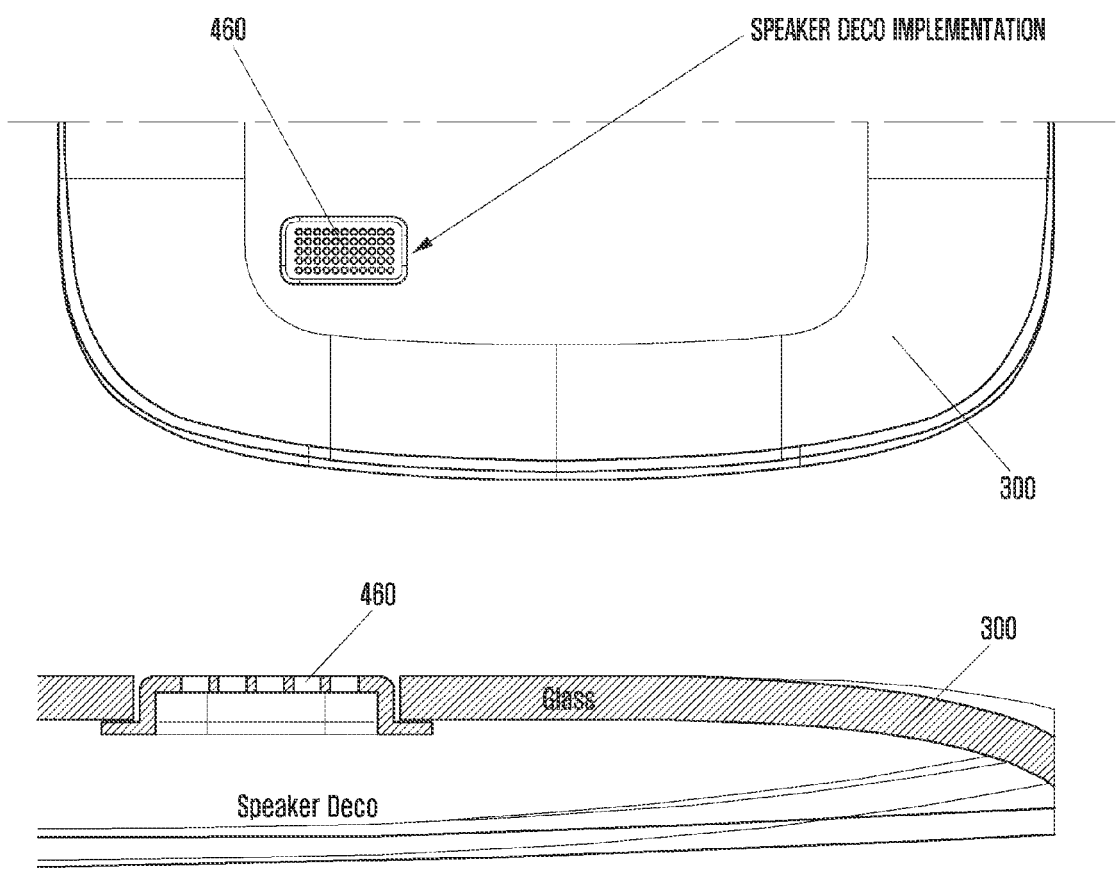

FIG. 12 illustrates a front view and a cross-sectional view of a part of a cover according to an embodiment of the present disclosure.

Referring to FIG. 12, the cover according to the present embodiment has a hole formed in a part of the glass member 300 and the speaker deco 460 is inserted through the hole, thereby implementing the radiation of the speaker. That is, a mesh of the speaker deco 460 is exposed through the hole formed through the glass member 300 such that sound or voice may pass through the mesh.

Although not illustrated nor described above, the electronic device of the present disclosure may selectively further include constituent elements having additional functions such as a Global Positioning System (GPS) module that receives position information, a broadcasting receiving module that receives broadcasting, a digital music reproducing module, and an internet communication module such as a Wi-Fi communication module that performs an internet function.

While all the components cannot be listed since they are variously modified according to the convergence trend of digital devices, the electronic device according to the present disclosure may further include components at the equivalent level to the above listed components. Electronic devices having a touch sensor unit according to the various embodiments of the present disclosure have been described above with reference to the drawings and specific terms have been used. However, the description and terms have been used in a general meaning merely to easily describe the technical contents of the present disclosure and to help the understanding of the present disclosure. The present disclosure is not limited to the various embodiments as described above. That is, it is apparent to those skilled in the art that other various embodiments based on the technical idea of the present disclosure can be implemented.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing having at least one coupling recess which is formed on an edge of the housing;
   a cover body configured to cover one surface of the housing;
   a coupling member coupled to the cover body configured to make the cover body detachable from/attachable to the at least one coupling recess; and
   a glass member attached to one surface of the cover body,
   wherein the coupling member is formed with a plurality of protrusion members, and the housing is formed with a plurality of coupling recesses, and
   wherein the plurality of protrusion members are formed such that widths of the plurality of protrusion members, widths of open angles of the plurality of protrusion members, the open angles of the plurality of protrusion members, and engagement amounts and engagement angles of the plurality of protrusion members to be engaged in the plurality of coupling recesses, are formed to be different from each other according to the order of the plurality of protrusion members to be separated when the cover body is separated from the housing.

2. The electronic device of claim 1, wherein the cover body includes, on a peripheral edge thereof, at least one hole corresponding to the at least one coupling recess.

3. The electronic device of claim 2, wherein the coupling member further includes:
   at least one protrusion member formed along an outer peripheral edge of the cover body to protrude outside the coupling member and exposed through the hole to be detachable from/attachable to the at least one coupling recess.

4. The electronic device of claim 3, wherein the at least one protrusion member is configured as a hook engaged in the at least one coupling recess.

5. The electronic device of claim 3, further comprising:
   a separating recess configured to separate the housing coupled to the cover body, the separating recess being formed by caving in a portion of the edge of the cover body by a predetermined depth.

6. The electronic device of claim 5, wherein the at least one protrusion member is formed with an inclined structure at a portion which is relatively nearer to the separating recess as compared to a remaining portion of the at least one protrusion member.

7. The electronic device of claim 6, wherein the inclined structure is tapered toward the separating recess.

8. The electronic device of claim 6,
wherein the coupling member is formed with a plurality of protrusion members, and
wherein the plurality of protrusion members are formed such that the inclined structure of a protrusion member which is separated relatively earlier in sequence when the cover body is separated from the housing is formed to have a relatively larger inclined angle.

9. The electronic device of claim 3, wherein the at least one coupling recess includes an inclined surface which is inclined from an inner portion to an outer portion of the edge of the housing.

10. The electronic device of claim 9,
wherein, while the at least one protrusion member is being engaged in the at least one coupling recess, the at least one protrusion member is compressed from an original volume thereof by a predetermined extent by the inclined surface of the at least one coupling recess, and
wherein, when the at least one protrusion member is completely engaged in the at least one coupling recess, the compression is released to be expanded to its original volume such that the at least one protrusion member is coupled to the at least one coupling recess.

11. The electronic device of claim 1,
wherein the coupling member is formed with a plurality of protrusion members, and
wherein the plurality of protrusion members are formed such that an engagement amount of a protrusion member which is separated relatively earlier in sequence when the cover body is separated from the housing is formed to be relatively smaller.

12. The electronic device of claim 1, wherein the coupling member is coupled to the cover body through at least one of dual injection molding, insert injection molding, bonding, welding, adhesive, or a fitting structure.

13. The electronic device of claim 1, wherein the coupling member is made of an elastic material which is at least one of Urethane, silicon, or rubber.

14. The electronic device of claim 1, wherein the glass member is configured to accommodate, on a portion of a surface thereof, at least one of a near field communication (NFC) antenna pattern, an NFC antenna contact, a laser direct structuring (LDS) antenna, an LDS antenna contact, a touch sensor unit configured to support a rear surface touch function, or a touch connector configured to connect the touch sensor unit and an electronic component inside the electronic device.

15. The electronic device of claim 1, wherein the glass member is integrally configured with a camera window.

16. An electronic device comprising:
a housing formed with a plurality of coupling recesses around a peripheral edge thereof that are spaced apart from each other by predetermined intervals;
a cover body formed with a plurality of holes around a peripheral edge thereof to correspond to the plurality of coupling recesses;
a coupling member configured to be detachable from/attachable to the plurality of coupling recesses by a plurality of protrusion members protruding from the cover body through the holes; and
a glass member attached to an outer surface of the cover body,
wherein the coupling member is formed with a plurality of protrusion members, and the housing is formed with a plurality of coupling recesses, and
wherein the plurality of protrusion members are formed such that widths of the plurality of protrusion members, widths of open angles of the plurality of protrusion members, the open angles of the plurality of protrusion members, and engagement amounts and engagement angles of the plurality of protrusion members to be engaged in the plurality of coupling recesses, are formed to be different from each other according to the order of the plurality of protrusion members to be separated when the cover body is separated from the housing.

17. The electronic device of claim 16, wherein the plurality of protrusion members are configured as a plurality of hooks engaged in the plurality of coupling recesses, respectively.

18. The electronic device of claim 16, further comprising:
a separating recess configured to separate the housing coupled to the cover body, the separating recess being formed by caving in a portion of an edge of the cover body by a predetermined depth.

19. The electronic device of claim 16, wherein the plurality of coupling recesses include an inclined surface which is inclined from an inner portion to an outer portion of an edge of the housing.

* * * * *